US008473905B1

(12) United States Patent
Takkallapally et al.

(10) Patent No.: US 8,473,905 B1
(45) Date of Patent: Jun. 25, 2013

(54) MANAGING USER INTERFACE CHARACTERISTICS IN DISPLAYING DATA STORAGE SYSTEMS INFORMATION

(75) Inventors: Anirudh Takkallapally, Natick, MA (US); Scott E. Joyce, Foxborough, MA (US); Munish Desai, Shrewsbury, MA (US); Sreenath Rajagopal, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 932 days.

(21) Appl. No.: 12/570,716

(22) Filed: Sep. 30, 2009

(51) Int. Cl.
G06F 9/44 (2006.01)
G06F 9/45 (2006.01)

(52) U.S. Cl.
USPC ............................ 717/118; 717/108; 717/116

(58) Field of Classification Search
USPC ...................... 717/108, 114–118, 120–122
See application file for complete search history.

(56) References Cited

U.S. PATENT DOCUMENTS

| | | | | |
|---|---|---|---|---|
| 6,342,907 B1* | 1/2002 | Petty et al. | ............ | 715/762 |
| 6,763,343 B1* | 7/2004 | Brooke et al. | ........... | 717/115 |
| 6,976,020 B2* | 12/2005 | Anthony et al. | ........... | 1/1 |
| 7,055,132 B2* | 5/2006 | Bogdan et al. | ........... | 717/116 |
| 7,076,766 B2* | 7/2006 | Wirts et al. | ........... | 717/121 |
| 7,165,239 B2* | 1/2007 | Hejlsberg et al. | ........... | 717/114 |
| 7,194,729 B2* | 3/2007 | Stone et al. | ........... | 717/108 |
| 7,194,730 B2* | 3/2007 | Pramberger | ........... | 717/120 |
| 7,200,838 B2* | 4/2007 | Kodosky et al. | ........... | 717/116 |
| 7,367,014 B2* | 4/2008 | Griffin | ........... | 717/107 |
| 7,451,472 B2* | 11/2008 | Williams | ........... | 725/107 |
| 7,565,640 B2* | 7/2009 | Shukla et al. | ........... | 717/105 |
| 7,631,291 B2* | 12/2009 | Shukla et al. | ........... | 717/107 |
| 7,698,684 B2* | 4/2010 | Baikov | ........... | 717/118 |
| 7,707,547 B2* | 4/2010 | Colton et al. | ........... | 717/118 |
| 7,895,566 B2* | 2/2011 | Shenfield et al. | ........... | 717/107 |
| 8,245,189 B2* | 8/2012 | Bojjireddy et al. | ........... | 717/117 |
| 8,327,323 B2* | 12/2012 | Holtz et al. | ........... | 717/108 |
| 8,327,328 B2* | 12/2012 | Colton et al. | ........... | 717/118 |

OTHER PUBLICATIONS

Vuletic et al, "Enabling unrestricted automated synthesis of portable hardware accelerators for virtual machines", ACM CODES, pp. 243-248, 2005.*
Varma et al, "Java through C Compilation: An enabling technology for Java in embedded systems", IEEE Date, pp. 1-6, 2004.*
Hunt, "Raltime Java technology in avionics systems", ACM JTRES, pp. 138-147, 2010.*
Tempero et al, "An empricial study of overriding in open source Java", ACM, pp. 3-12, 2010.*
Fleischmann et al, "A hardware/software prototyping environment for dynamically reconfigurable embedded systems", IEEE, pp. 1-5, 1998.*

* cited by examiner

*Primary Examiner* — Anil Khatri
(74) *Attorney, Agent, or Firm* — Krishnendu Gupta; Jason A. Reyes; Daniel P. McLoughlin

(57) ABSTRACT

Managing user interface characteristics in displaying data storage system information. New functionality may be provided that can effect look-and-feel skinning for OEM and client customization. Extensions to conventional Java Synth Look-and-Feel technology for support of OEM and client customization may be enabled. Multiple Synth XML files can be merged, e.g., on the fly, and form one Synth XML file. One primary Synth XML file may be provided and any Style elements defined in secondary XML files may override corresponding Style elements in the primary XML file. For example, an OEM customer can define one Button Style in a secondary (customer's) XML file, and this definition can be detected at runtime and overrides a primary XML file's Button Style, resulting in the OEM look and feel.

16 Claims, 6 Drawing Sheets

MANAGING USER INTERFACE CHARACTERISTICS IN DISPLAYING DATA STORAGE SYSTEMS INFORMATION

BACKGROUND

1. Field of the Invention

The present invention relates to managing user interface characteristics in displaying data storage system information.

2. Description of Prior Art

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen or other display, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

One example of this kind of graphical user interface includes a screen presentation that may include toolbars with accompanying menus and menu items as well as displays such as graphs, tables, maps or trees.

With respect to the GUI, people today use the World Wide Web for a variety of different and diverse tasks for example locating information, ordering and buying goods on-line and managing their finances. Many users expect that these applications will operate regardless of what type of computer platform is used.

Java technology helps provide a solution by allowing the creation of computer platform independent programs. Java is a registered trademark of Oracle and/or its affiliates. Other names used herein may be trademarks of their respective owners. The Java technology includes an object oriented programming language and a platform on which to run the Java applications. Java is both a compiled and an interpreted language. The source code that has been written by the application developer is compiled into an intermediate form called a Java bytecode, which is a platform independent language. At a client machine, the java bytecodes are interpreted by the Java platform and the Java interpreter parses and runs each Java bytecode instruction on the computer. (If the Java bytecode is run as an applet, it may first be sent over the network to the client machine.)

The Java platform includes the Application Programming Interface (API), which is a large collection of ready-made software components, which provide a variety of capabilities, and the Java Virtual Machine (JVM) which will be explained in the paragraph below. Together the JVM and the API sit on top of the hardware based computer platform and provide a layer of abstraction between the Java program and the underlying hardware.

The JVM is made up of software, which can run a Java program on a specific computer platform of a client machine. Before a Java program can be run on a JVM, the Java program must first be translated into a format that the JVM recognizes, which is called a Java class file format. The Java class file format contains all the information needed by a Java runtime system to define a single Java class.

The creation of Java GUIs is currently implemented with the Java Swing package. Previously, the Abstract Windows Toolkit (AWT) library was available for working with graphics. This package contains a simple set of classes such as Buttons, TextField, Label and others. A more advanced set of classes is contained in the later introduced library called Swing. Swing, like AWT, is a package that also includes buttons, text fields, and other classes for providing window controls.

In today's web server environment, many alternatives are provided for an application provided by a web server to interact with a user at a client machine. One alternative may include downloading a Java applet from a web server to a client. The Java applet typically includes library calls from the Java Platform software development toolkit (SDK). The Java applet contains computer instructions written in the Java language which are executed by a JVM resident on the client machine to interact with a user of the client machine. Executing such computer instructions on the client machine lowers the capacity requirements of a web server and the bandwidth to communicate the results of those instructions from the web server to the client. When a Java applet renders user interface screens on a client machine, it typically calls a class named LookAndFeel to make each user interface screen rendered by the Java applet consistent with other user interface screens generated by the same Java applet. Utilizing the LookAndFeel class, for example, a Java applet may readily set the foreground, background, and font properties for each screen the Java applet renders to the user.

Each LookAndFeel class has a list of User Interface Defaults (UI defaults) used to initialize Java components with defaults such as default fonts, colors, icons, and borders. For the UI defaults, a large hash table UIDefaults is provided which can be accessed using a getDefaults( ) method. When initialized, the LookAndFeel class gets its entire definition from a single XML file config.xml and initially populates the UIDefaults table based on the contents of the XML file.

A getDefaults( ) method can be called on a LookAndFeel object. Entries in the hash table use String keys and values of types such as type Boolean, Integer, String, Border, Color, Icon, and Font. A generic get( ) method on UIDefaults returns an Object value. If a new value is put into the table using a defaults.put method before components are constructed, the new value can affect how those components are initialized. Thus, changing a default value in the table only affects future component construction, and does not affect not components already built and initialized.

SUMMARY OF THE INVENTION

A method is used in managing user interface characteristics in displaying data storage system information. A user editable file is provided that includes a definition that affects a look and feel of a user interface of a Java application. Based on the user editable file, Java technology is driven to update only a subset of a Java user interface defaults table for use with the Java application.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Described below is a technique for use in managing user interface characteristics in displaying data storage system information. In accordance with the technique, new functionality may be provided that, in at least one implementation, can effect look and feel skinning for OEM and client customization. In particular, the technique helps enable an extension to conventional Java Synth Look and Feel technology for support of OEM and client customization.

Conventionally, as is known in the art, Java Synth uses a single XML file config.xml which defines how components should be painted. The XML file includes Style elements which are bound to individual regions such as Buttons and TextField. The Style elements define how individual parts of the component should be painted, including, for example, background and border.

By contrast, in accordance with the technique herein, multiple Synth XML files can be merged, e.g., on the fly, and form one Synth XML file. In at least one implementation, one primary Synth XML file is provided and any Style elements defined in secondary XML files override corresponding Style elements in the primary XML file. For example, an OEM customer can define one Button Style in a secondary (customer's) XML file, and this definition is detected at runtime and overrides a primary XML file's Button Style, resulting in the OEM look and feel.

Also in accordance with the technique, OEM customization can be achieved through use of a properties file. The properties file is read, and based on a type of an object and a value defined in the properties file, a UIDefaults table is updated which gives the OEM customer the desired look and feel. An example of definitions in a properties file is provided below:
Button.Background=<Color>Blue
Table.Border=<Border>4
Table.RowHight=<Integer>20

Figure 1:
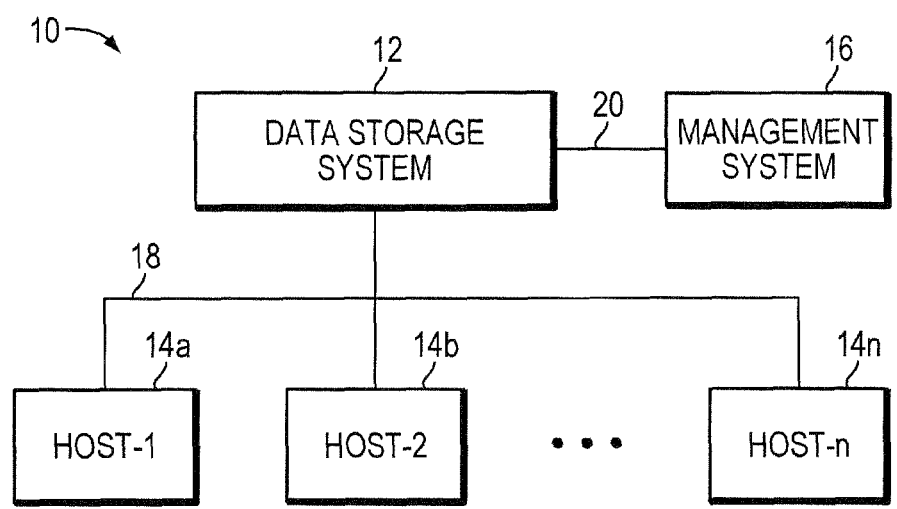
FIG. 1 is an example of an embodiment of a system that may utilize the techniques described herein.

Referring now to FIG. 1, shown is an example of an embodiment of a computer system that may be used in connection with performing the technique described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

Figure 2:
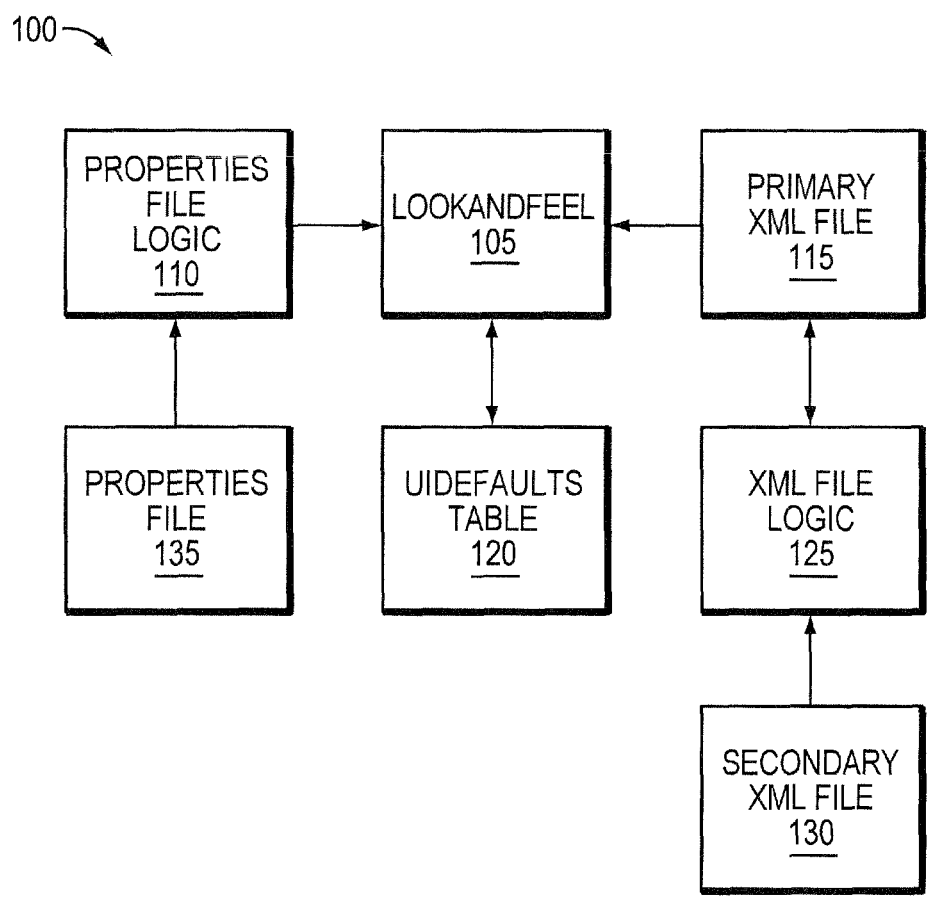
FIG. 2 is an example of components that may be included in the system for use in performing the techniques herein.

Referring now to FIG. 2, shown is an example 100 of components that may be used in connection with the technique described herein, particularly in connection with providing a Java based GUI for use with management system 16. In at least one implementation, Lookandfeel class 105, primary XML file 115, and UIDefaults table 120 are conventional Java functionality that are used as described herein. In accordance with the technique, before class 105 is initiated, XML file logic 125 may be used to update the contents of file 115 based on secondary XML file 130 as described herein. In such a case, when class 105 is initiated, it gets its entire definition from file 115 and populates table 120 based on the updated contents of file 115.

Also in accordance with the technique, properties file logic 110 may be used to cause Lookandfeel class 105 to update UIDefaults table 120 based on information from properties file 135 as described herein. Once logic 110 uses a default-s.put method of class 105 to put a new value or object into table 120, the new value or object affects how related components are initialized thereafter.

Figure 3:
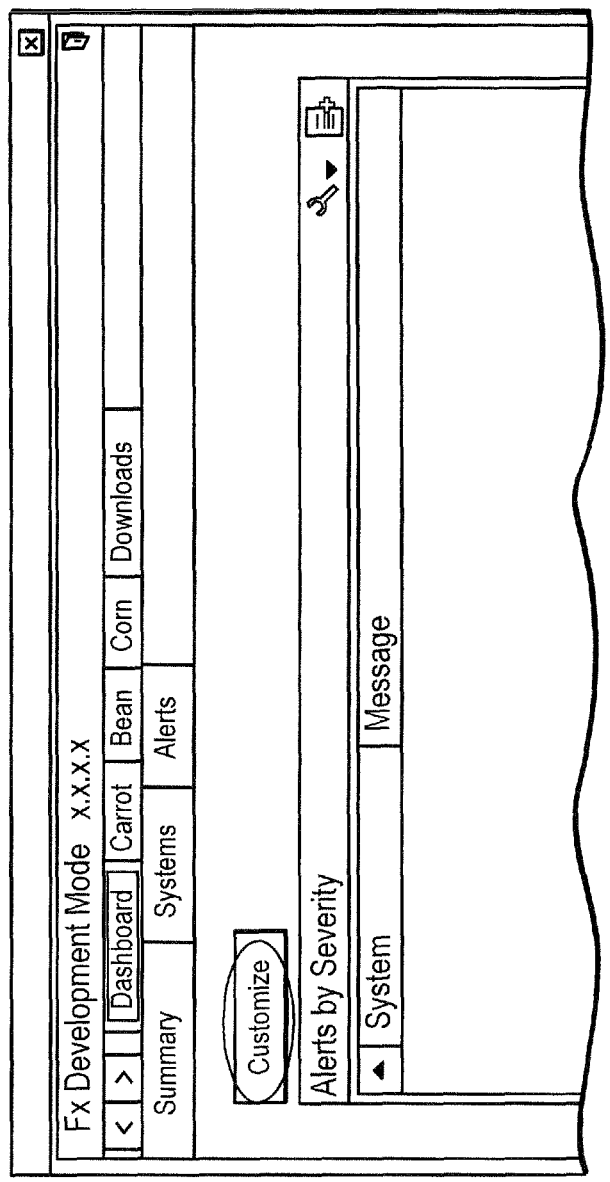
FIGS. 3-6 are example of graphical user interface screens for use in performing the techniques herein.
Figure 4:
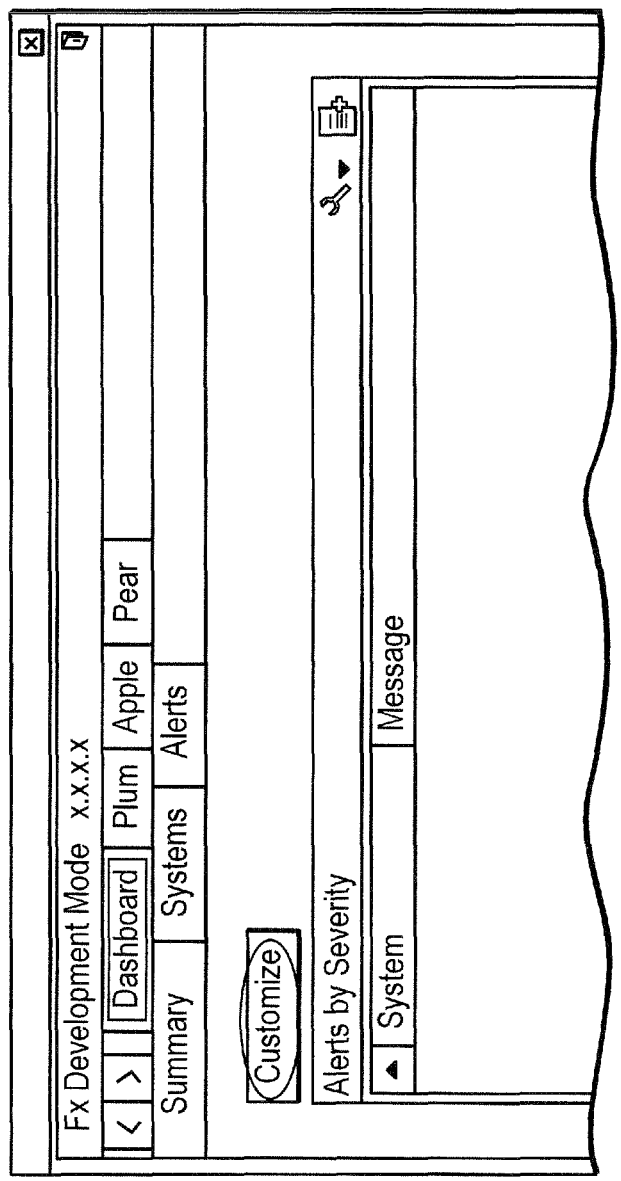

FIGS. 3-4 illustrate an example of using Synth XML elements of file 115 to change a button font and font size. When a Java application starts up, before applying the look and feel using class 105, the application identifies file 115 (e.g., Ecue-Synth.xml) and checks whether there are any secondary XML files 130 (e.g., CustomOEM.xml). If file 130 is found, the application uses logic 125 (which may be included in the application or in a separate framework) to read files 115, 130 and merge them together to form an updated version of file 115. The updated version is then used by class 105 to create the look and feel.

During the merge, logic replaces <bind . . . > elements that are present in file 115 with corresponding new elements that are present in file 130 and adds a new <style> element to file 115, which is used to change the font and size of the font on a button.

If there are no files 130, by default file 115 is used as normal to create the look and feel.

FIG. 3 illustrates an example of output if there are no files 130. As shown in FIG. 3, on a "Customize" button, for example, the text of the word "Customize" has a standard font with a medium font size.

The font and font size of the button text can be changed, e.g., by the OEM customer, by providing an XML code snippet such as the following in file 130.

```
<synth>
    <style id="Button Style">
    <state>
        <font name="Arial" size="20"/>
        <color type="FOREGROUND" value="#000000"/>
        <color type="BACKGROUND" value="#FFFFFF"/>
    </state>
    <state value="DISABLED">
        <color            type="TEXT_FOREGROUND"
            value="#A0A0A0"/>
    </state>
    </style>
    <bind    style="Button    Style"    type="region"
key="Button"/>
</synth>
```

Once the application starts up, it picks up file 130 and merges it with file 115. In particular, logic 125 replaces the <bind style="Button Style" type="region" key="Button"/> tag in file 115 with the new one provided and adds the new <style . . . > tag content provided.

FIG. 4 illustrates that the font and font size have been changed on the buttons as a result of file 130.

Figure 5:
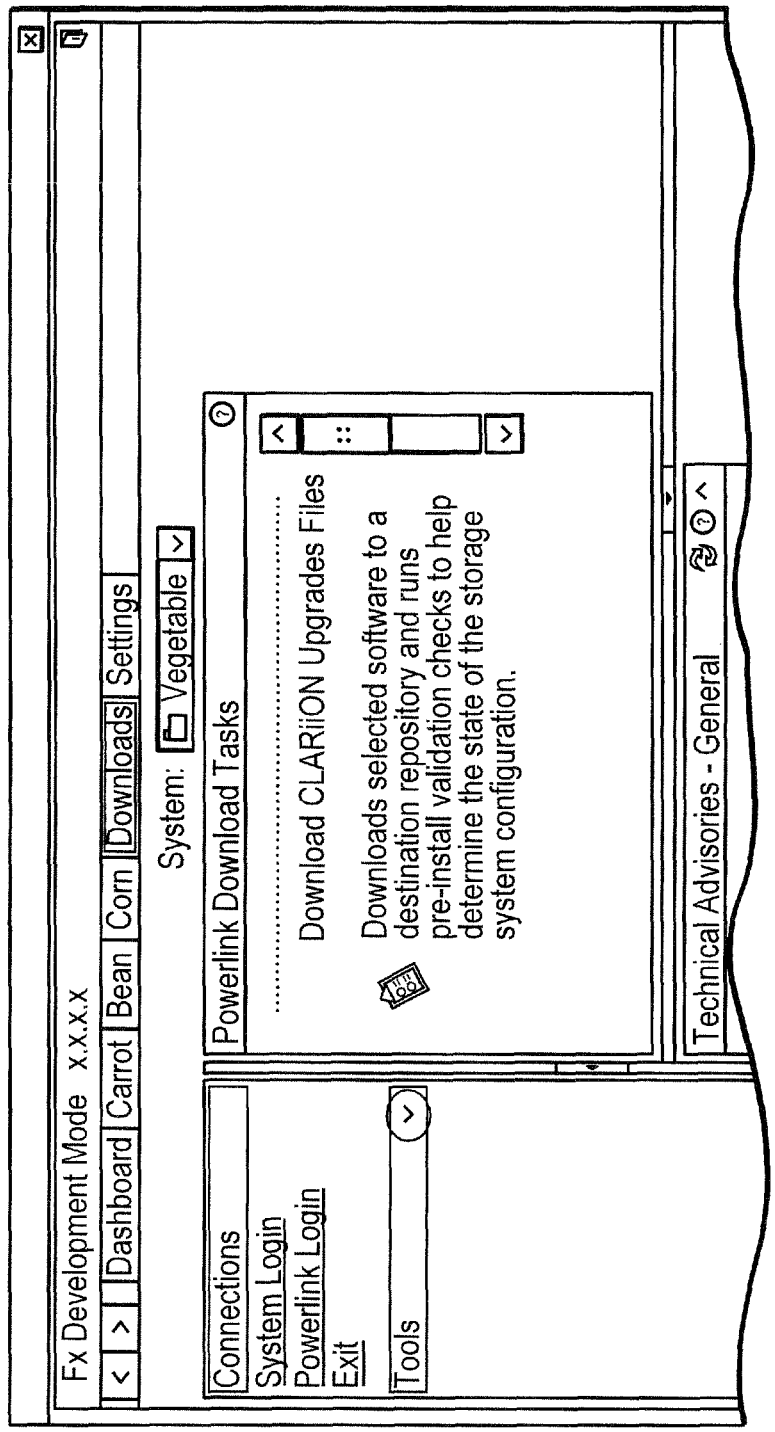
Figure 6:
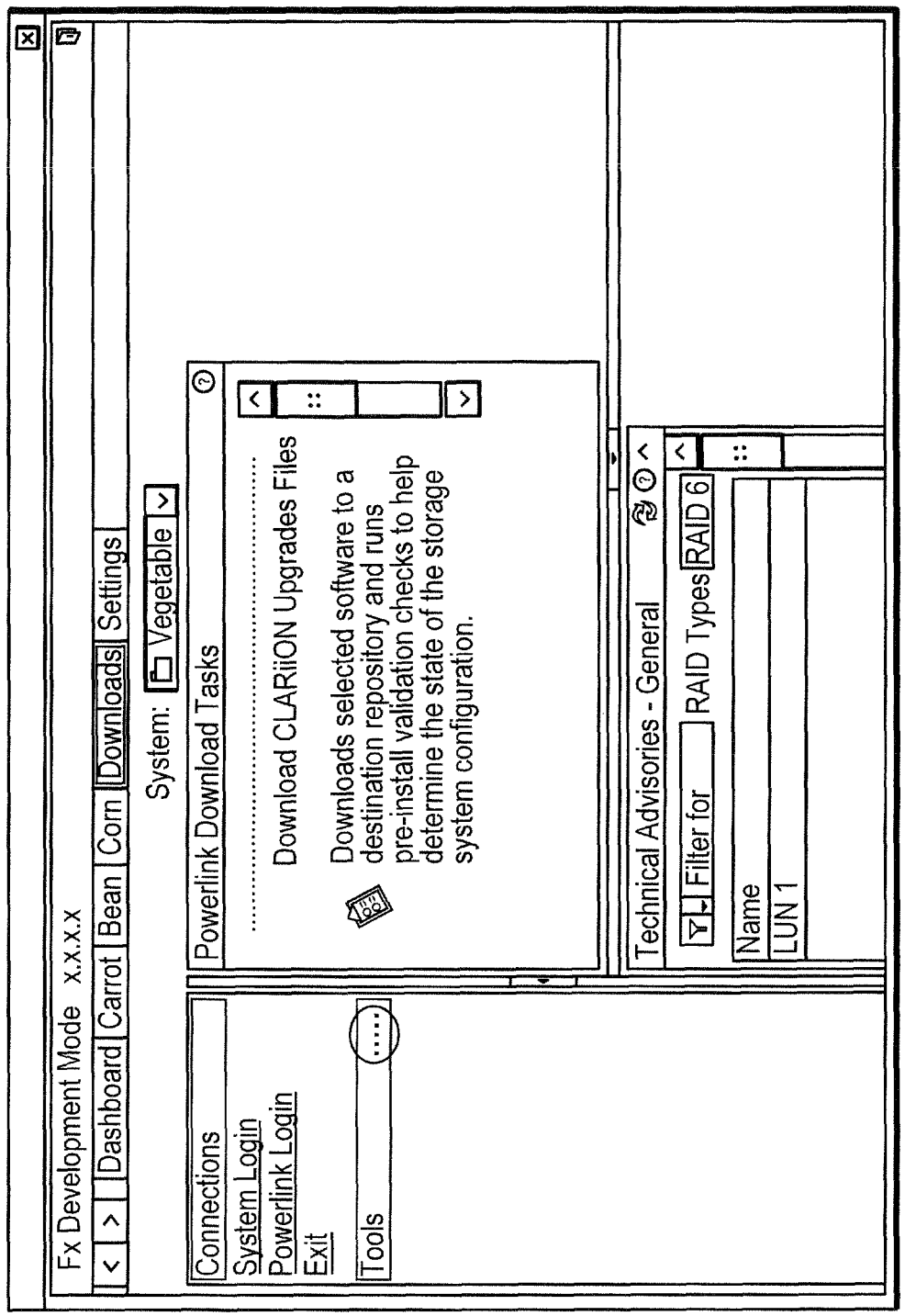

FIGS. 5-6 illustrate an example of using properties file 135 to change output, e.g., an image, based on custom properties. First the application starts up and applies the look and feel, and then checks for custom properties in file 135 and uses logic 110 to replace key value pairs present in the UIDefaults table. FIGS. 5-6 illustrate results of replacing a collapsed collapsible pane down arrow image with an ellipses ( . . . ) image.

Without file 135, when the application is run, the collapsible pane has the down arrow image when it is collapsed, as shown in FIG. 5.

To change the down arrow of the collapsed collapsible pane to the ellipses image, a CollapsiblePane.downIcon property is added, e.g., by an OEM or user, in file 135, e.g., as follows:
CollapsiblePane.downIcon=image:/com/emc/ecuelaf/resources/images/SplitterThumb.gif In at least one implementation, file 135 is named CustomLAF.properties and is expected to be found in a resources folder or directory as follows:
com/emc/services/lafservice/resources/CustomLAF.properties FIG. 6 illustrates a new version of the collapsed collapsible pane which uses the ellipses image as result of logic 110 using the defaults.put method of class 105 to apply file 135.

One or more implementations may have one or more of the following features. Logic 110 and/or logic 125 may expose only a limited subset of objects or values of table 120 to change, to help avoid corruption or other undesirable results. Logic 110 and/or logic 125 may expose any component of the application to change, e.g., scroll bar. The properties file may be structured to be accessed by key and value. Changes to table 120 may be made in a particular order or priority. For example, a first set of changes based on file 130 may be made before a second set of changes based on file 135, so that the second set can override the first set. In another example, a second properties file may be provided, e.g., by a customer or end user, and changes based on the second properties file may be made after changes based on file 135.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of executing a Java application by a processor comprising:
   providing a user editable file that includes a definition that affects a look and feel of a user interface of a the Java application, wherein the user-editable file is a first Java Synth configuration XML file;
   based on the user editable file, driving Java technology to update only a subset of a Java user interface defaults table for use with the Java application, including:
   deriving, from the user editable file and second Java Synth configuration XML file, an updated second Java Synth configuration XML file, including using Style elements defined in the user-editable file to override corresponding Style elements in the second Java Synth configuration XML file,
   wherein the Java technology uses the updated second Java Synth configuration XML file to initially populate the Java user interface defaults table; and
   controlling a display of data storage system information with user interface characteristics affected by the updated subset.

2. The method of claim 1, further comprising:
based on the user editable file, causing the update to occur after the Java technology uses a Java Synth configuration XML file to initially populate the Java user interface defaults table.

3. The method of claim 1, further comprising:
merging Java Synth configuration XML files to form a new Java Synth configuration XML file.

4. The method of claim 1, further comprising:
reading a properties file; and
based on a type of an object and a value defined in the properties file, updating a UIDefaults table is to give a desired look and feel.

5. The method of claim 1, further comprising:
before applying look and feel, identifying a Java Synth configuration XML file and checking whether any other Java Synth configuration XML files are found.

6. The method of claim 1, further comprising:
replacing <bind . . . > elements that are present in a first Java Synth configuration XML file with corresponding new elements that are present in a second Java Synth configuration XML file.

7. The method of claim 1, further comprising:
exposing only a limited subset of contents of UIDefaults table to change.

8. The method of claim 1, further comprising:
based on a properties file, making a first set of changes to a UIDefaults table before making a second set of changes to the UIDefaults table.

9. The method of claim 1, further comprising:
after making a first set of changes to a UIDefaults table based on a first properties file, making a second set of changes to the UIDefaults table based on a second properties file.

10. A system for executing a Java application comprising a processor configured with logic to:
   provide a user editable file that includes a definition that affects a look and feel of a user interface of a Java application, wherein the user-editable file is a first Java Synth configuration XML file;
   based on the user editable file, drive Java technology to update only a subset of a Java user interface defaults table for use with the Java application, including:
   deriving, from the user editable file and second Java Synth configuration XML file, an updated second Java Synth configuration XML file, including using Style elements defined in the user-editable file to override corresponding Style elements in the second Java Synth configuration XML file,
   wherein the Java technology uses the updated second Java Synth configuration XML file to initially populate the Java user interface defaults table; and
   control a display of data storage system information with user interface characteristics affected by the updated subset.

11. The system of claim 10, wherein the processor is further configured with logic to:
cause, based on the user editable file, the update to occur after the Java technology uses a Java Synth configuration XML file to initially populate the Java user interface defaults table.

12. The system of claim 10, wherein the processor is further configured with logic to:

merge Java Synth configuration XML files to form a new Java Synth configuration XML file.

13. The system of claim 10, wherein the processor is further configured with logic to:
read a properties file; and
update, based on a type of an object and a value defined in the properties file, a UIDefaults table is to give a desired look and feel.

14. The system of claim 10, wherein the processor is further configured with logic to:
identify, before applying look and feel, a Java Synth configuration XML file and checking whether any other Java Synth configuration XML files are found.

15. The system of claim 10, wherein the processor is further configured with logic to:
replace <bind . . . > elements that are present in a first Java Synth configuration XML file with corresponding new elements that are present in a second Java Synth configuration XML file.

16. The system of claim 10, wherein the processor is further configured with logic to:
expose only a limited subset of contents of UIDefaults table to change.

\* \* \* \* \*